United States Patent
Tanno et al.

(10) Patent No.: US 12,519,359 B2
(45) Date of Patent: Jan. 6, 2026

(54) DYNAMO-ELECTRIC MACHINE AND COOLING STRUCTURE FOR DYNAMO-ELECTRIC MACHINE

(71) Applicant: SUMITOMO BAKELITE CO., LTD., Tokyo (JP)

(72) Inventors: Toshihiro Tanno, Tokyo (JP); Wataru Kosaka, Tokyo (JP); Shinya Yamamoto, Tokyo (JP); Atsunori Nishikawa, Tokyo (JP); Takahiro Harada, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 309 days.

(21) Appl. No.: 18/007,640

(22) PCT Filed: May 24, 2021

(86) PCT No.: PCT/JP2021/019548
§ 371 (c)(1),
(2) Date: Dec. 1, 2022

(87) PCT Pub. No.: WO2021/246216
PCT Pub. Date: Dec. 9, 2021

(65) Prior Publication Data
US 2023/0231432 A1    Jul. 20, 2023

(30) Foreign Application Priority Data

Jun. 5, 2020   (JP) ................................ 2020-098293
Jan. 6, 2021   (JP) ................................ 2021-000721

(51) Int. Cl.
*H02K 3/24* (2006.01)
*H02K 9/19* (2006.01)
*H02K 21/14* (2006.01)

(52) U.S. Cl.
CPC ................. *H02K 3/24* (2013.01); *H02K 9/19* (2013.01); *H02K 21/14* (2013.01)

(58) Field of Classification Search
CPC ........... H02K 3/24; H02K 21/14; H02K 9/19; H02K 15/12; H02K 9/197; H02K 9/227;
(Continued)

(56) References Cited

U.S. PATENT DOCUMENTS 5,232,970 A * 8/1993 Sole ........................ C08L 77/06
524/404
5,973,427 A    10/1999 Suzuki et al.
(Continued)

FOREIGN PATENT DOCUMENTS

DE   10.2017 221 835 A1   6/2019
JP        37-24210 Y1     9/1962
(Continued)

OTHER PUBLICATIONS

JP2004297924A English translation (Year: 2024).*
(Continued)

*Primary Examiner* — Christopher M Koehler
*Assistant Examiner* — Viswanathan Subramanian
(74) *Attorney, Agent, or Firm* — Birch, Stewart, Kolasch & Birch, LLP

(57) ABSTRACT

A motor (100) includes a stator (6) having a plurality of tooth portions (7), a coil (9) wound around the tooth portions (7), and a slot (8) in which the coil (9) is formed between the tooth portions (7), in which the coil (9) is provided in the slot (8), and a cooling structure for the motor (100) includes a first resin composition with which the slot (8) is filled and which covers the coil (9), and a coil inner side cooling flow path (10) which is provided in a region filled with the first resin composition and extends in a rotating shaft direction, and in which a coolant circulates inside.

14 Claims, 6 Drawing Sheets

(58) Field of Classification Search
CPC ...... H02K 2213/03; H02K 3/34; H02K 9/225; Y02T 10/64
See application file for complete search history.

(56) References Cited

U.S. PATENT DOCUMENTS

| | | | |
|---|---|---|---|
| 7,514,826 | B2 | 4/2009 | Wakita |
| 2006/0145548 | A1 | 7/2006 | Wakita |
| 2011/0156504 | A1* | 6/2011 | Kurahara ............... H02K 3/325 310/43 |
| 2020/0014274 | A1* | 1/2020 | Petitgas ................... H01B 3/46 |
| 2020/0204023 | A1 | 6/2020 | Hoerz et al. |
| 2020/0295614 | A1 | 9/2020 | Cunningham et al. |
| 2022/0360152 | A1* | 11/2022 | Watanabe .............. H02K 15/12 |

FOREIGN PATENT DOCUMENTS

| | | | | |
|---|---|---|---|---|
| JP | 7-322566 | A | 12/1995 | |
| JP | 10-327558 | A | 12/1998 | |
| JP | 2003-250239 | A | 9/2003 | |
| JP | 2003-284277 | A | 10/2003 | |
| JP | 2004-23805 | A | 1/2004 | |
| JP | 2004-248429 | A | 9/2004 | |
| JP | 2004-297924 | A | 10/2004 | |
| JP | 4496710 | B2 | 7/2010 | |
| JP | 2016144270 | A * | 8/2016 | ............... H02K 1/14 |
| WO | WO-2016002906 | A1 * | 1/2016 | ............. H01F 41/12 |
| WO | WO 2018/211086 | A1 | 11/2018 | |

OTHER PUBLICATIONS

WO2016002906A1 English translation (Year: 2024).*
JP2016144270A English translation (Year: 2024).*
International Search Report for PCT/JP2021/019548 (PCT/ISA/210) mailed on Aug. 10, 2021.
Written Opinion of the International Searching Authority for PCT/JP2021/019548 (PCT/ISA/237) mailed on Aug. 10, 2021.

* cited by examiner

DYNAMO-ELECTRIC MACHINE AND COOLING STRUCTURE FOR DYNAMO-ELECTRIC MACHINE

TECHNICAL FIELD

The present invention relates to a dynamo-electric machine and a cooling structure for the dynamo-electric machine.

BACKGROUND ART

In order to efficiently cool a stator in a dynamo-electric machine such as a motor or a generator, a structure in which a cooling jacket structure is disposed at a cylindrical case that is disposed around the outer periphery of the stator and heat is allowed to escape from the stator to the case has been proposed in the past (the related art).

For example, Patent Document 1 discloses a technique in which in a dynamo-electric machine in which a coil concentratedly wound around tooth portions of a stator is accommodated in a slot between the tooth portions, a plurality of pipes extending in an axial direction are disposed in parallel in an internal space of the slot, a gap between the pipes and a gap between the pipe and the coil are filled with a resin material to form a resin layer that closes the slot that is open toward the inner periphery side of the stator, and a refrigerant is allowed to flow through the pipes.

RELATED DOCUMENT

Patent Document

[Patent Document 1] Japanese Patent No. 4496710

SUMMARY OF THE INVENTION

Technical Problem

However, in the related art described above, since heat is transferred from the coil generating the heat to a stator core and heat transfer paths from the stator core to the case and from the case to a cooling jacket are long, in the structure, cooling efficiency is not good. Further, in many cases, minute gaps are present between the coil and the stator core and between the stator core and the case, and this also becomes a factor that hinders heat transfer.

In the technique disclosed in Patent Document 1, although a certain improvement in cooling performance can be expected, there is a problem in that the structure is complicated and the adoption as a product is limited.

The present invention has been made in view of such circumstances and has an object to provide a cooling structure for a dynamo-electric machine that improves the cooling performance of a stator.

Solution to Problem

According to an aspect of the present invention, there is provided a cooling structure for a dynamo-electric machine which includes a stator having a plurality of tooth portions, a coil wound around the tooth portions, and a slot formed between the tooth portions, and in which the coil is provided in the slot, the cooling structure includes:
a first resin composition with which the slot is filled and which covers the coil; and
a first cooling flow path which is provided in a region filled with the first resin composition and extends in a rotating shaft direction, and in which a coolant circulates inside.

According to another aspect of the present invention, there is provided a dynamo-electric machine having the cooling structure described above.

Advantageous Effects of Invention

According to the present invention, it is possible to provide a cooling structure for a dynamo-electric machine that improves the cooling performance of a stator.

DESCRIPTION OF EMBODIMENTS

First Embodiment

Overview

Figure 1:
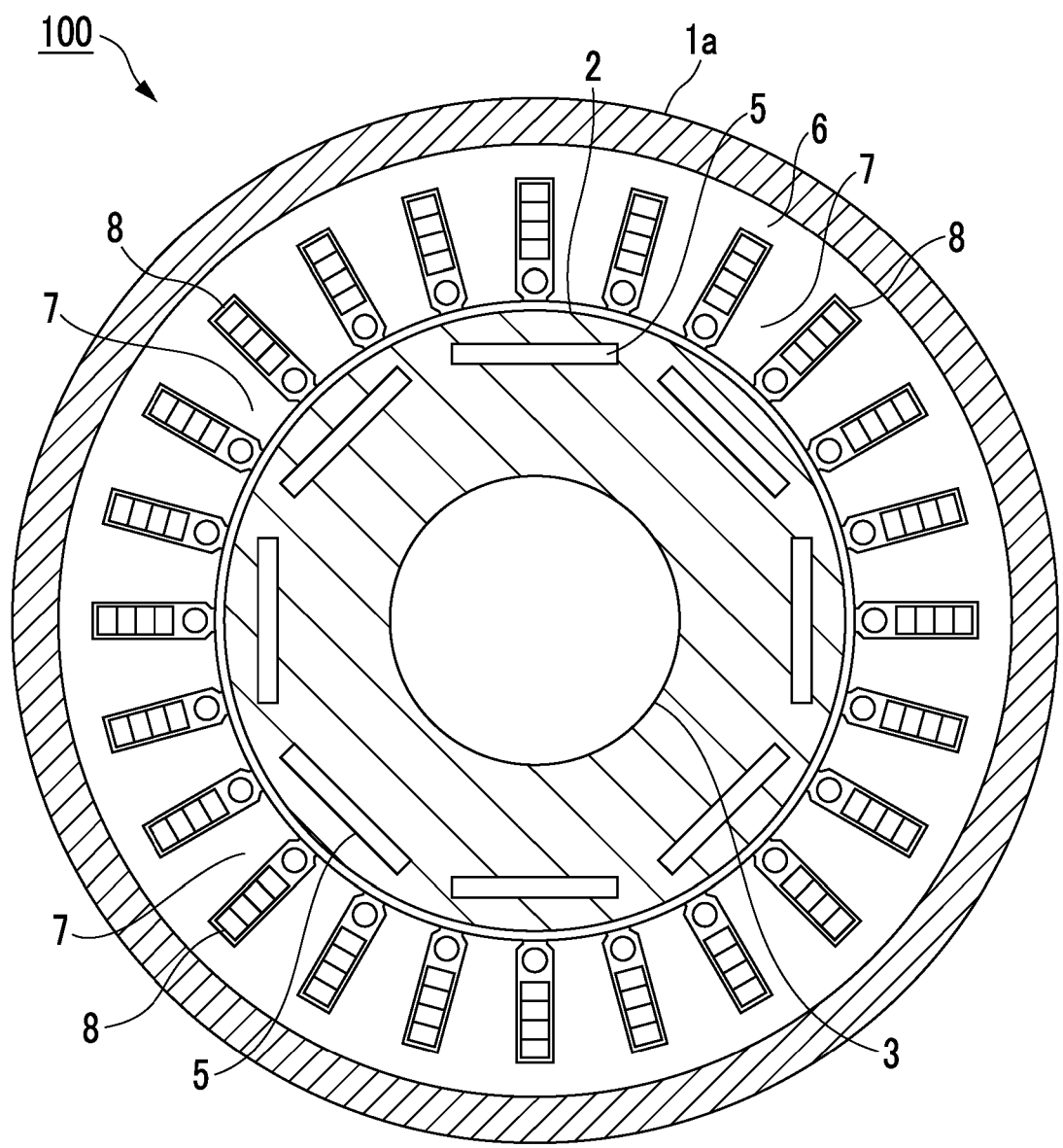
FIG. 1 is a vertical cross-sectional view in a direction perpendicular to a rotating shaft direction of a motor according to a first embodiment.
Figure 2:
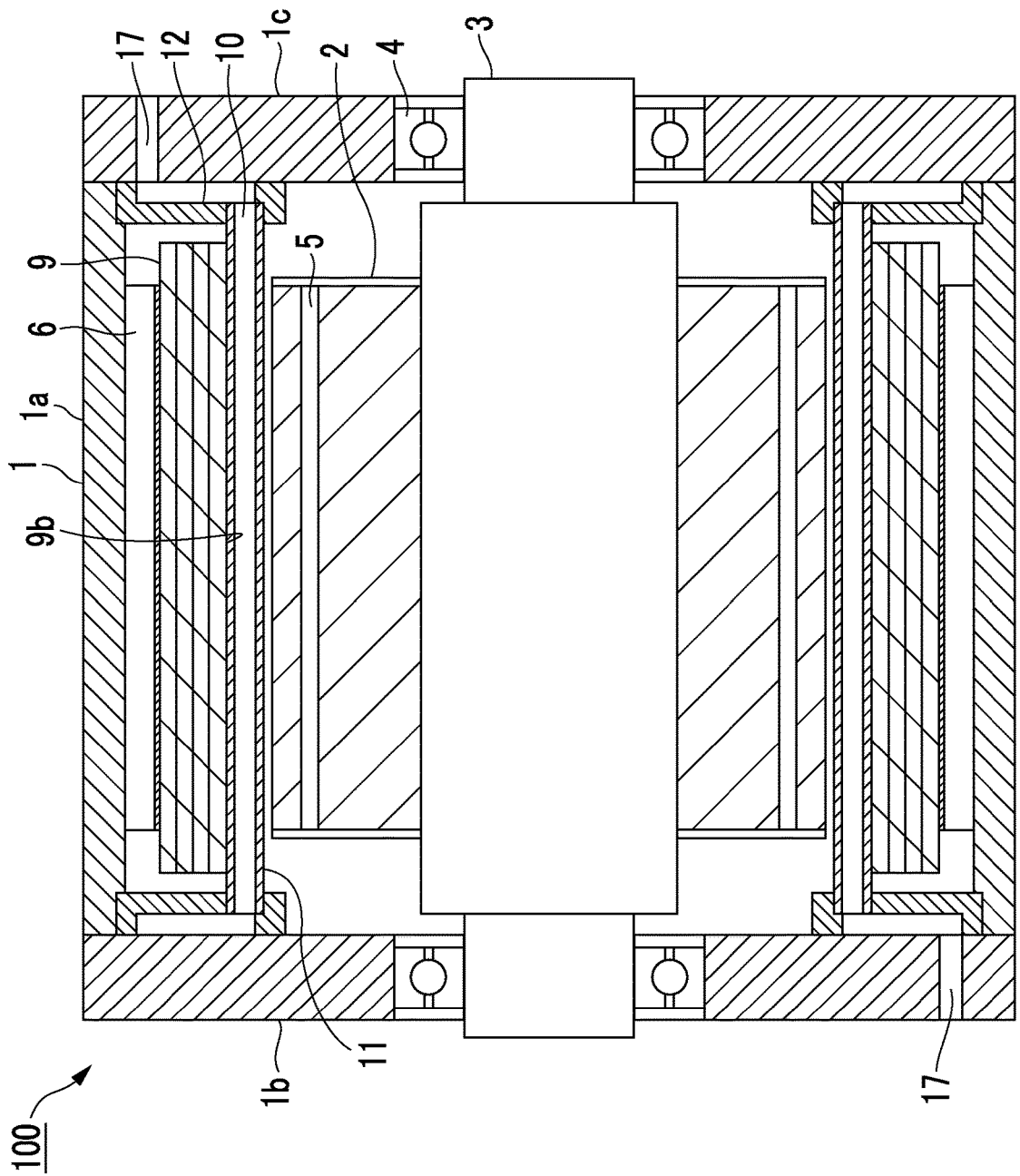
FIG. 2 is a vertical cross-sectional view in the rotating shaft direction of the motor according to the first embodiment.
Figure 3:
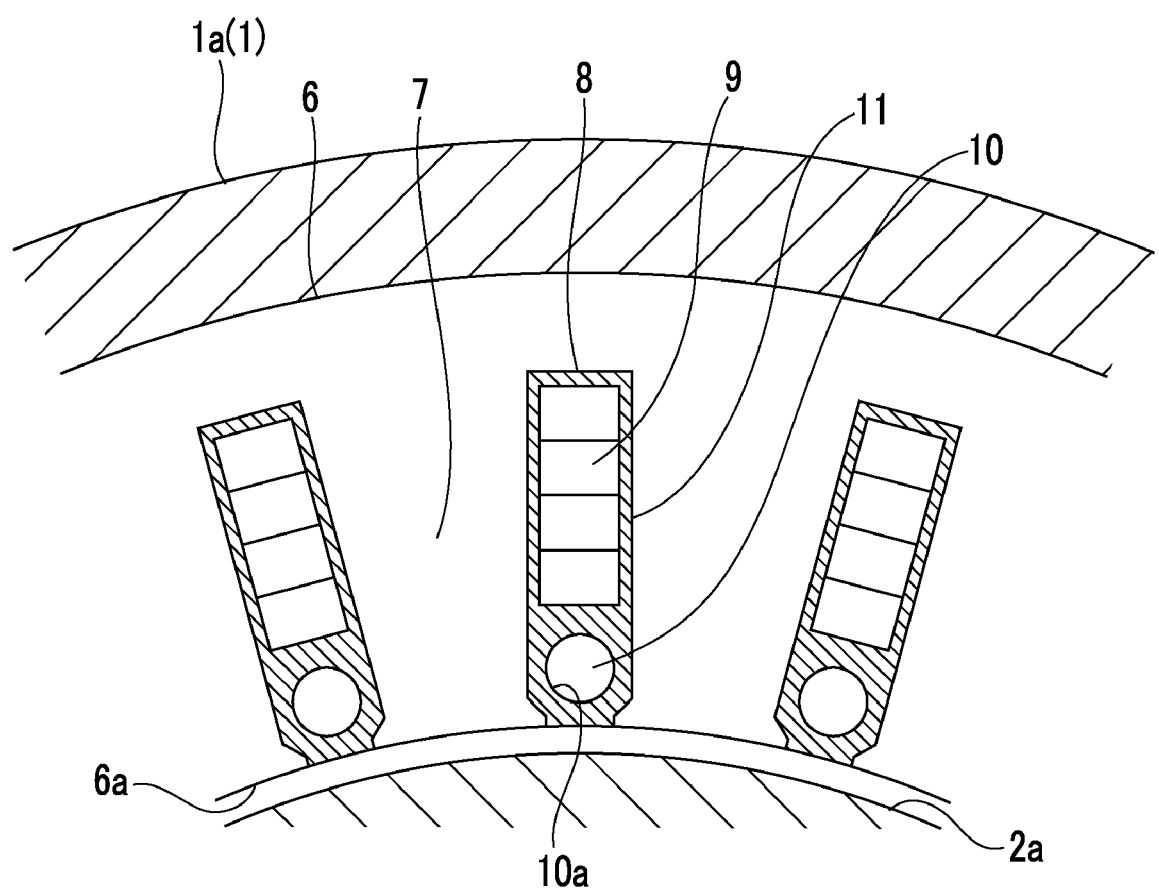
FIG. 3 is a diagram showing the periphery of a slot according to the first embodiment in an enlarged manner.

In the present embodiment, an example in which an electric motor (a motor) is applied as a dynamo-electric machine (an electric motor, a generator, or a dual-use machine for an electric motor and a generator) will be described. FIG. 1 is a vertical cross-sectional view in a direction perpendicular to a rotating shaft direction of a motor 100. FIG. 2 is a vertical cross-sectional view in the rotating shaft direction of the motor 100. FIG. 3 is a diagram showing the periphery of a slot in FIG. 1 in an enlarged manner.

The overview of the present embodiment is as follows.

In the motor 100, a coil 9 distributed and wound around a tooth portion 7 of a stator 6 is accommodated in a slot 8 between the tooth portions 7. A coil inner side cooling flow path 10 (a first cooling flow path) extending in an axial direction is disposed on the inner periphery side of the stator 6 (in the vicinity of a tooth inner peripheral surface 6a) and at a position adjacent to the coil 9 in an internal space of the slot 8. Further, a resin material (hereinafter also referred to as a "first resin composition") with which a gap except for the coil 9 or the coil inner side cooling flow path 10 in the internal space of the slot 8 is filled, and a cooling liquid flows through the coil inner side cooling flow path 10 to cool the stator 6. With such a structure of the motor 100, the coil inner side cooling flow path 10 can be disposed adjacent to the coil 9 at the position on the inner periphery side of the stator 6 (in the vicinity of the tooth inner peripheral surface 6a) with respect to the coil 9, so that the coil 9 generating heat can be efficiently cooled.

Hereinafter, a specific description will be made.

<Basic Structure of Motor 100>

The motor 100 includes a case 1, and a rotor 2 (a rotor) and a stator 6 (a stator) accommodated inside the case 1.

The case 1 is configured to have a cylindrical portion 1a and side plate portions 1b and 1c that close both ends in the axial direction of the cylindrical portion 1a. As the material of the case 1, for example, an aluminum alloy (casting product), a resin material, or a combination thereof can be used. Each of the side plate portions 1b and 1c is provided with an external connection flow path 17 that connects the coil inner side cooling flow path 10 and an external cooling flow path.

The rotor 2 is accommodated inside the case 1. A rotating shaft 3 is mounted at the center of the rotor 2 as an output shaft.

Both ends of the rotating shaft 3 are respectively supported by the side plate portions 1b and 1c through bearings 4. In this way, the rotor 2 is rotatable with the rotating shaft 3 as the center.

A permanent magnet 5 is embedded in the rotor 2. Specifically, as shown in FIG. 1, a plurality of (here, eight) permanent magnets 5 are disposed at regular intervals on the same circumference. At this time, the magnetic poles of the permanent magnets 5 adjacent to each other are installed to be different from each other.

The cylindrical stator 6 is disposed on and fixed to the inner periphery of the cylindrical portion 1a so as to surround the outer periphery of the rotor 2. As shown in FIG. 3, a minute gap (air gap) is provided between the inner peripheral surface 6a of the stator 6 and an outer peripheral surface 2a of the rotor 2.

The tooth portions 7 facing the inner peripheral surface 6a are arranged in the stator 6. Here, as shown in FIG. 1, twenty-four tooth portions 7 are provided. The slot 8 is provided between the tooth portions 7.

The coil 9 is accommodated in the slot 8 in a distributed and wound manner. The tooth portion 7 is provided corresponding to the permanent magnets 5 described above, and each coil 9 is sequentially excited, so that the rotor 2 rotates due to attraction and repulsion with respect to the corresponding permanent magnet 5.

<Coil Inner Side Cooling Flow Path 10>

The coil inner side cooling flow path 10 extending in the axial direction is provided on the inner periphery 6a side of the stator 6 and at the position adjacent to the coil 9 in the internal space of the slot 8. A cooling liquid, for example, cooling water, circulates through the coil inner side cooling flow path 10.

The coil inner side cooling flow path 10 can be formed by inserting a tubular part into the slot 8, or can also be obtained by a method of directly molding a resin material (the first resin composition) in the stator 6. In this case, an inner wall 10a of the coil inner side cooling flow path 10 is configured as a part of a hardened material (hereinafter referred to as a "first hardened resin material") of the resin material injected into the stator 6.

In a case where the coil inner side cooling flow path 10 is provided as a tubular part, a highly thermally-conductive non-magnetic metal such as aluminum or an aluminum alloy, or a highly thermally-conductive inorganic material can be used. Further, a tubular resin part provided separately from the resin material (the first resin composition) filled in the slot 8 described above may be used.

An example of applying a method of directly molding a resin material (the first resin composition) in the stator 6 will be described below.

The number of coil inner side cooling flow paths 10 that are disposed in one slot 8 may be one or plural. However, in a situation where the space width of the slot 8 is narrow, it is preferable that the number of the flow paths is small such that the cross-sectional area of the flow path is large, in consideration of the flow resistance when the cooling liquid passes. The cross-sectional shape of the coil inner side cooling flow path 10 can be circular as in the present embodiment, or can also be square or matched to the shape of the slot 8.

Further, in the present embodiment, the coil 9 is a distributed winding wound across a plurality of slots 8. Therefore, at least one coil inner side cooling flow path 10 may be provided for each set of slots 8 configuring one distributed winding. For example, in a case where a certain coil 9 is wound across two slots 8, one slot 8 is provided with the coil inner side cooling flow path 10, and the other slot 8 is not provided with the coil inner side cooling flow path 10. In a set of a plurality of slots 8 configuring one distributed winding, if at least one slot 8 is provided with the coil inner side cooling flow path 10, the other slot 8 in which the coil inner side cooling flow path 10 is not provided (that is, the tooth portion 7) can also be cooled through the coil 9.

Further, an insulating layer 11 is provided between the slot 8 and the coil 9. The insulating layer 11 can be formed of insulating paper or an insulating resin material, and is preferably disposed before the coil 9 is inserted into the stator 6. However, it can also be formed by filling a resin material (the first resin composition) in a gap except for the coil 9 or the coil inner side cooling flow path 10 in the internal space of the slot 8, which will be described later. In this case, the inner wall 10a of the coil inner side cooling flow path 10 is composed of the insulating layer 11 made of a hardened material of the first resin composition.

Then, after the coil inner side cooling flow path 10, the insulating layer 11, and the coil 9 are disposed in the slot 8, the gap between the members is filled with a resin material and the members are fixed. It is assumed that this resin material can withstand the heat generated by the coil 9.

<First Resin Composition>

The resin material (the first resin composition) with which the coil inner side cooling flow path 10, the insulating layer 11, and the gap between members are filled is preferably a resin material with good thermal conductivity, and one type of resin or a combination of plural types of resins for each member can be used. For example, one or two types of thermosetting resins selected from the group consisting of an epoxy resins and a phenol resins can be used.

Thermal conductivity K1 of the first hardened resin material, which is the hardened material of the first resin composition, is in a range of 1 to 10 W/m·K. The lower limit of the thermal conductivity K1 is preferably 2 W/m·K or more, and more preferably 3 W/m·K or more. The upper limit of the thermal conductivity K1 is not particularly limited. However, it is 10 W/m·K as a realistic value.

A glass transition temperature Tg1 of the first hardened resin material is 150° C. or higher.

The glass transition temperature Tg1 is set to be within the above range, so that the heat resistance performance of the motor 100 can be improved and a high output can be realized.

When a sample obtained by heat-treating the first hardened resin material at 175° C. for 4 hours is measured using a dynamic viscoelasticity measuring device under the conditions of a measurement temperature in a range of −50° C. to 200° C., a temperature increase rate of 5° C./min, a load of 800 gf, a frequency of 10 Hz, and a three-point bending mode, a storage elastic modulus at 25° C. is 20 GPa or more and 70 GPa or less.

The lower limit of the storage elastic modulus is preferably 30 GPa or more, and more preferably 40 GPa or more.

The upper limit of the storage elastic modulus is preferably 60 GPa or less, and more preferably 50 GPa or less.

From this point of view as well, the storage elastic modulus is set to be within the above range, so that the heat resistance performance of the motor 100 can be improved and a high output can be realized.

A resin thickness t1 of the first hardened resin material that covers a coil side surface portion 9b of the coil 9 is, for example, 0.3 mm or more and 3.0 mm or less.

The lower limit of the resin thickness t1 is preferably 0.5 mm or more, and more preferably 0.7 mm or more. The upper limit of the resin thickness t1 is preferably 2.5 mm or less, and more preferably 2.0 mm or less.

The resin thickness t1 is set to be within the above range, so that it is possible to appropriately maintain the insulation properties and to favorably transmit the heat generated in the coil 9 to the coil inner side cooling flow path 10.

A relational expression P1=t1/K1 between the resin thickness t1 and the thermal conductivity K1 of the first hardened resin material is, for example, $0.3 \times 10^{-4}$ ($m^2K/W$) or more and $3 \times 10^{-3}$ ($m^2K/W$) or less.

The lower limit of the relational expression P1 is preferably $0.4 \times 10^{-4}$ ($m^2K/W$) or more, and more preferably $0.5 \times 10^{-4}$ ($m^2K/W$) or more. The upper limit of the relational expression P1 is preferably $2.5 \times 10^{-3}$ ($m^2K/W$) or less, and more preferably $2 \times 10^{-3}$ ($m^2K/W$) or less.

The value of the relational expression P1 is set to be within the above range, so that it is possible to appropriately maintain the insulation properties and to favorably transmit the heat generated in the coil 9 to the coil inner side cooling flow path 10.

Further, although a method for molding the insulating layer 11 is not particularly limited, insert molding can be used. At this time, insert molding is performed by disposing a mold structure (a nested structure) corresponding to the coil inner side cooling flow path 10 in the slot 8 in which the distributed and wound coil 9 is disposed.

As described above, the coil inner side cooling flow path 10 formed in each slot 8 of the stator 6 is connected to a flow path connection part 12 which is disposed inside each of the side plate portions 1b and 1c, and further connected to a cooling liquid inlet and outlet of each of the side plate portions 1b and 1c, so that the motor 100 can be cooled. As shown in the drawing, the flow path connection part 12 may be configured as an independent part and may have a configuration in which it is mounted to the end portion of the coil inner side cooling flow path 10, or a configuration in which it is integrated with each of the side plate portions 1b and 1c, and it is favorable if the coil inner side cooling flow path 10 and the external connection flow path 17 can appropriately communicate with each other.

A packing, an O-ring, a sealing material, or the like necessary for preventing leakage of the cooling liquid is disposed at each of the joined portions of the coil inner side cooling flow path 10, the flow path connection part 12, and the side plate portions 1b and 1c.

In the flow path connection part 12, the flows of the cooling water to many coil inner side cooling flow paths 10 can be controlled by adjusting the design of a flow path groove. Similarly, by adjusting the design of the flow path groove of the flow path connection part 12, the inlet and outlet for the cooling water can be collectively disposed at one of the side plate portions 1b and 1c, or the inlet and outlet can be disposed in the cylindrical portion 1a.

In the motor 100 having the above configuration, for example, cooling water is introduced into the motor 100 from the external connection flow path 17 of the side plate portion 1b on the left side in the drawing. The cooling water introduced into the motor 100 circulates through the coil inner side cooling flow path 10 through the flow path connection part 12, and is discharged from the external connection flow path 17 of the side plate portion 1c to the outside through the flow path connection part 12 on the side plate portion 1c side.

<Operation and Effect of Coil Inner Side Cooling Flow Path 10>

According to the present embodiment, in the motor 100 having a distributed winding, the heat generated by the coil 9 can be efficiently dissipated to the coil inner side cooling flow path 10 adjacent thereto, and the space around the coil 9 (that is, the slot 8) is replaced with a resin material, so that transfer of the heat can be further facilitated. In particular, since the coil 9 and the stator 6 are tightly filled with a resin material, the inner wall 10a of the coil inner side cooling flow path 10 is formed of the resin material, so that heat conduction between them is improved. In this way, the cooling performance of the stator 6 can be improved, a copper loss (a loss that is consumed by the resistance of the winding of the coil 9 itself) can be reduced, the motor output can be improved, and downsizing or the like of the motor 100 can be realized.

<Summary of Features and Functions of Motor 100 (Dynamo-electric Machine)>

The features of the motor 100 of the present embodiment will be collectively described with a focus on the cooling structure.

(1) The cooling structure for the motor 100 (dynamo-electric machine) which includes the stator 6 having a plurality of tooth portions 7, the coil 9 wound around the tooth portions 7, and the slot 8 formed between the tooth portions 7, and in which the coil 9 is provided in the slot 8, the cooling structure including:

the first resin composition with which the slot 8 is filled and which covers the coil 9; and the coil inner side cooling flow path 10 (the first cooling flow path) which is provided in a region filled with the first resin composition and extends in the rotating shaft direction, and in which a coolant circulates inside.

The space (that is, the slot 8) around the coil 9 is replaced with a resin material, so that the heat generated in the coil 9 can be efficiently transferred.

(2) The inner wall 10a of the coil inner side cooling flow path 10 may be made of a hardened resin material with high thermal conductivity.

(3) The hardened resin material may be a member obtained by hardening the first resin composition.

The inner wall 10a of the coil inner side cooling flow path 10 is made of a member obtained by hardening the first resin composition filled in the slot 8, so that the number of components in the cooling structure can be reduced, the cooling performance can be improved accordingly, and simplification of the manufacturing process can be realized.

(4) The thermal conductivity K1 of the first hardened resin material may be in a range of 1 to 10 W/mK.

(5) The glass transition temperature Tg1 of the first hardened resin material may be 150° C. or higher.

(6) When a sample obtained by heat-treating the first hardened resin material at 175° C. for 4 hours is measured using a dynamic viscoelasticity measuring device under conditions of a measurement temperature in a range of −50° C. to 200° C., a temperature increase rate of 5° C./min, a load of 800 gf, a frequency of 10 Hz, and a three-point bending mode, storage elastic modulus at 25° C. may be 20 GPa or more and 70 GPa or less.

(7) The resin thickness t1 of the first hardened resin material that covers the coil side surface portion 9b of the coil 9 may be 0.3 mm or more and 3.0 mm or less.

The lower limit of the resin thickness t1 is preferably 0.5 mm or more, and more preferably 0.7 mm or more. The upper limit of the resin thickness t1 is preferably 2.5 mm or less, and more preferably 2.0 mm or less. The resin thickness t1 is set to be within the above range, so that it is possible to appropriately maintain the insulation properties and to favorably transmit the heat generated in the coil 9 to the coil inner side cooling flow path 10.

(8) The relational expression P1=t1/K1 between the resin thickness t1 and the thermal conductivity K1 of the first hardened resin material is $0.3 \times 10^{-4}$ (m²K/W) or more and $3 \times 10^{-3}$ (m²K/W) or less.

The lower limit of the relational expression P1 is preferably $0.4 \times 10^{-4}$ (m²K/W) or more, and more preferably $0.5 \times 10^{-4}$ (m²K/W) or more.

The upper limit of the relational expression P1 is preferably $2.5 \times 10^{-3}$ (m²K/W) or less, and more preferably $2 \times 10^{-3}$ (m²K/W) or less.

The value of the relational expression P1 is set to be within the above range, so that it is possible to appropriately maintain the insulation properties and to favorably transmit the heat generated in the coil 9 to the coil inner side cooling flow path 10.

(9) The inner wall 10a of the coil inner side cooling flow path 10 may be made of metal with high thermal conductivity.

(10) The inner wall 10a of the coil inner side cooling flow path 10 may be made of an inorganic material with high thermal conductivity.

(11) The coil inner side cooling flow path 10 may be provided on the rotating shaft direction side with respect to the coil 9.

The coil inner side cooling flow path 10 is disposed in such a manner, so that the entire coil 9 can be efficiently cooled.

(12) The coil 9 is configured as a distributed winding wound across a plurality of slots 8.

In the case of the distributed winding, there is a tendency for a copper loss to increase due to its structure, and effective heat dissipation is required. Therefore, by adopting the cooling structure having a configuration as described above, it is possible to realize good cooling performance (heat dissipation performance) even in a dynamo-electric machine such as a distributed winding type.

(13) At least one of the coil inner side cooling flow paths 10 may be provided for each set of slots 8 configuring one distributed winding.

In the case of the distributed winding, since it straddles a plurality of slots 8, if there is the coil inner side cooling flow path 10 in at least one slot 8, the other slot 8 (the tooth portion 7) on the side where there is the coil inner side cooling flow path 10 can also be cooled through the coil 9.

(14) The first resin composition may include one or two types of thermosetting resins selected from the group consisting of an epoxy resin and a phenol resin.

Such a thermosetting resin is used as the first resin composition, so that high heat dissipation performance can be realized.

(15) The dynamo-electric machine has the cooling structure described above. The dynamo-electric machine is the motor 100 (an electric motor) described above, a generator, a dual-use machine for an electric motor and a generator, or the like.

Second Embodiment

Figure 4:
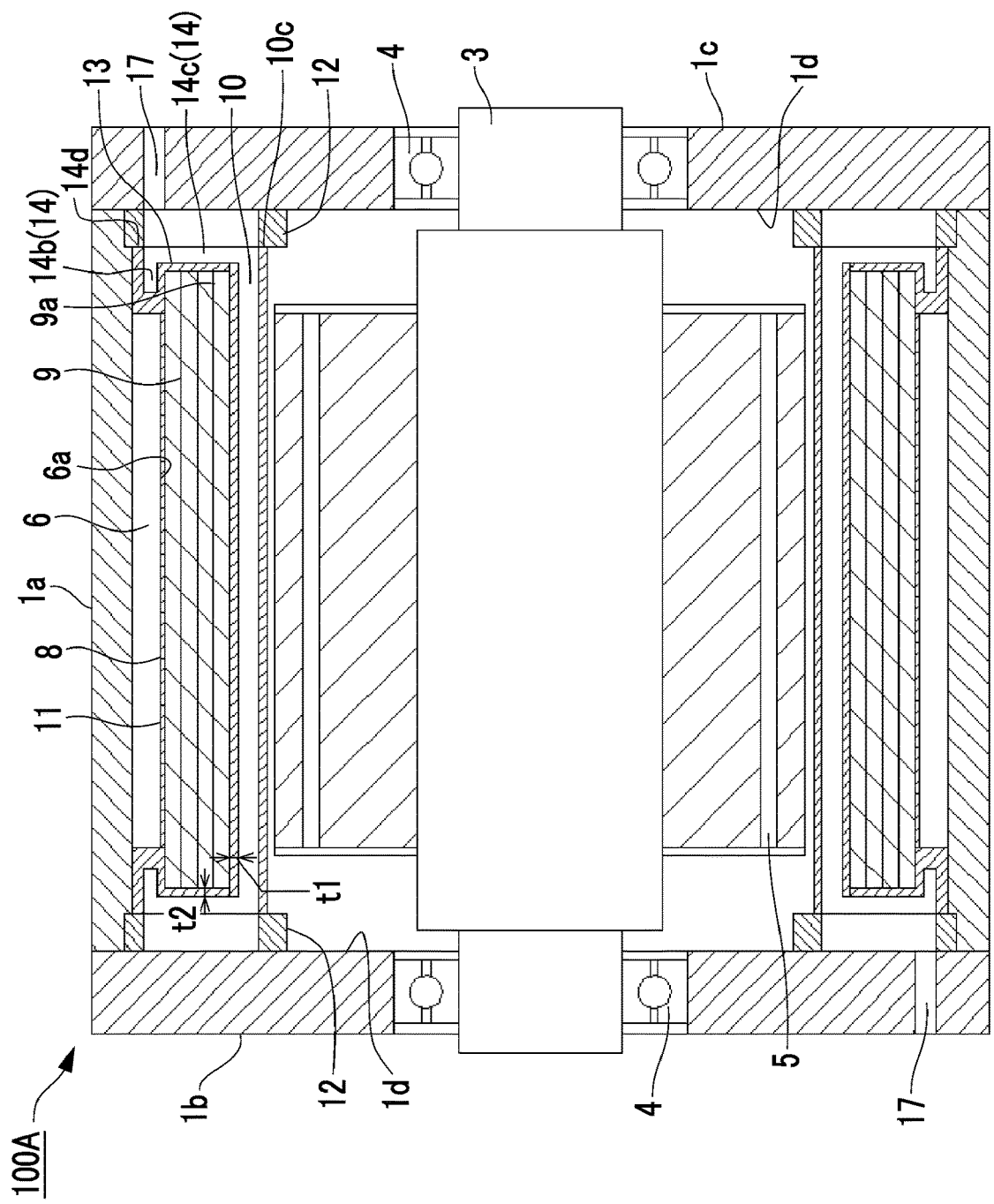
FIG. 4 is a vertical cross-sectional view in a rotating shaft direction of a motor according to a second embodiment.
Figure 5:
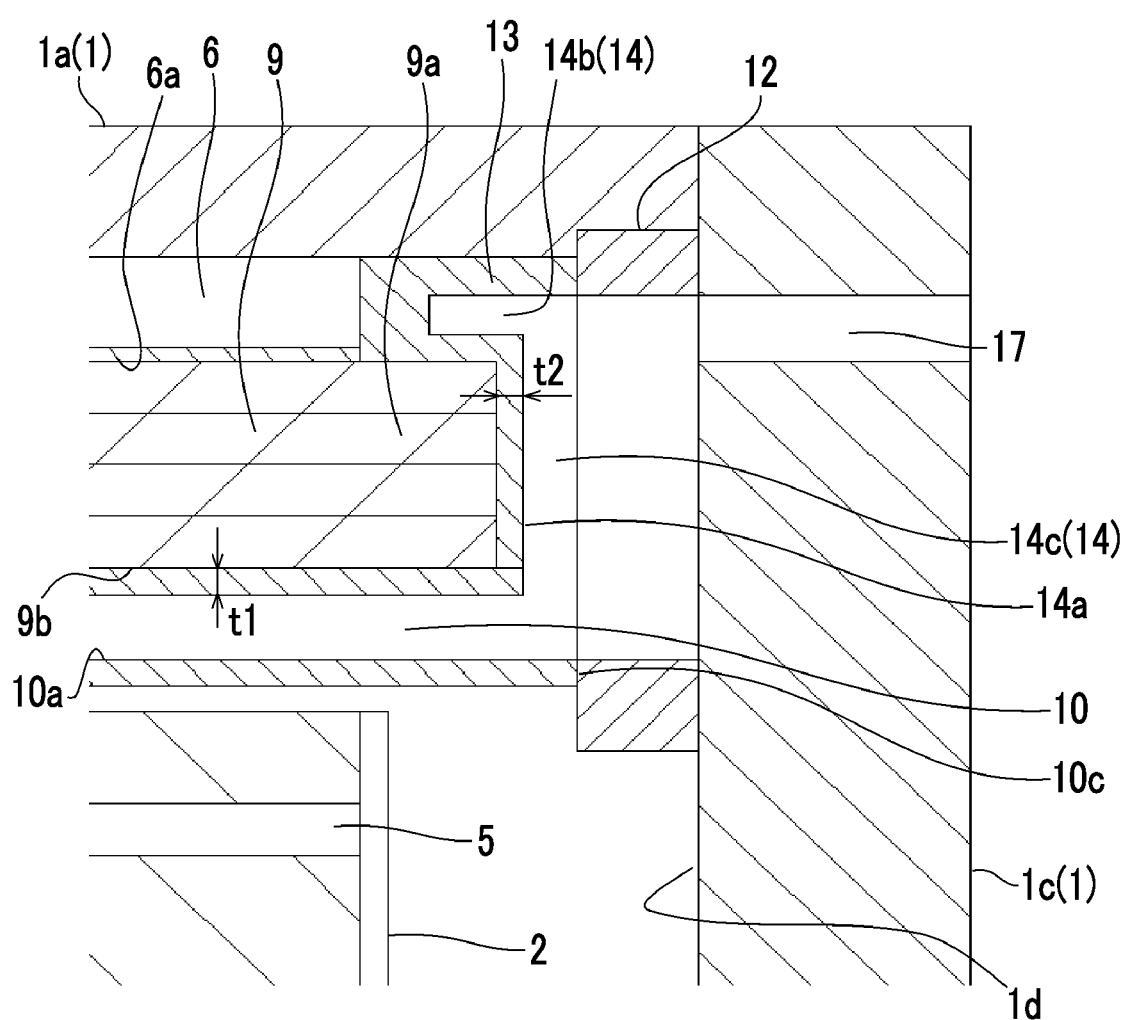
FIG. 5 is a diagram showing the periphery of a coil 9b in the cross-sectional view of FIG. 4 according to the second embodiment in an enlarged manner.
Figure 6:
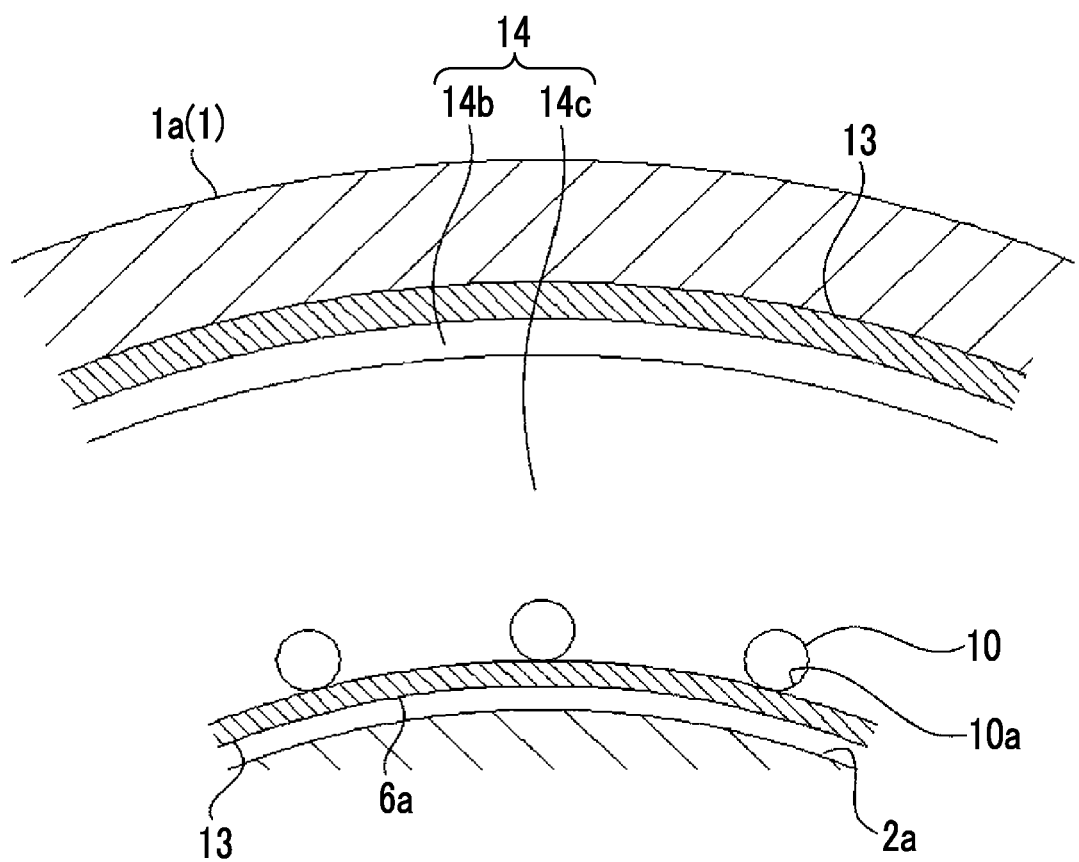
FIG. 6 is a vertical cross-sectional view in a direction perpendicular to the rotating shaft direction of a region provided with a coil end portion cooling flow path according to the second embodiment.

A motor 100A of the present embodiment is different from the motor 100 of the first embodiment in the structure around the coil end portion, and in the following, a description will be made with a focus on mainly the different parts. FIG. 4 is a vertical cross-sectional view of the motor 100A in the rotating shaft direction. FIG. 5 is a diagram showing the periphery of a coil end portion 9a of FIG. 4 according to the present embodiment in an enlarged manner. FIG. 6 is a vertical cross-sectional view of the motor 100A in a direction perpendicular to the rotating shaft direction according to the embodiment, and is particularly a cross-sectional view of a region where a coil end portion cooling flow path 14 is provided.

The overview of the present embodiment is as follows.

In the motor 100A, the coil 9 distributed and wound around the tooth portions 7 of the stator 6 is accommodated in the slot 8 between the tooth portions 7, as in the first embodiment. The coil inner side cooling flow path 10 extending in the axial direction is disposed on the inner periphery side of the stator 6 (in the vicinity of the tooth inner peripheral surface 6a) and at the position adjacent to the coil 9 in the internal space of the slot 8. A gap except for the coil 9 or the coil inner side cooling flow path 10 in the internal space of the slot 8 is filled with a resin material (the first resin composition).

Further, as one of the major features of the present embodiment, the coil end portion 9a of the coil 9, which protrudes to the outer side in the rotating shaft direction of the stator 6, is covered with an insulating layer 13, which is a hardened material of a resin material (a second resin composition), and the coil end portion cooling flow path 14 extending in a circumferential direction is formed on the outer side in the rotating shaft direction and/or the outer side in the circumferential direction of the coil end portion 9a.

With such a structure of the motor 100A, the coil inner side cooling flow path 10 can be disposed adjacent to the coil 9 at the position on the inner periphery side (in the vicinity of the tooth inner peripheral surface 6a) of the stator 6 with respect to the coil 9, and the coil end portion cooling flow path 14 can be further disposed adjacent to the coil 9 also at the position of the end portion in the rotating shaft direction of the coil 9. Therefore, the coil 9 generating heat can be efficiently cooled.

Hereinafter, a specific description will be made with a focus on the coil end portion cooling flow path 14.

<Coil End Portion Cooling Flow Path 14>

The coil end portion cooling flow path 14 extending in the circumferential direction is provided on the outer side in the rotating shaft direction and/or the outer side in the circumferential direction of the coil end portion 9a in a space at the end portion of the coil 9, which protrudes to the outer side in the rotating shaft direction (in a lateral direction in FIG. 4 or 5) of the stator 6. A cooling liquid, for example, cooling water, circulates through the coil end portion cooling flow path 14. As shown in FIG. 6, the coil end portion cooling flow path 14 has a configuration in which an internal space is provided in an annular shape (in FIG. 6, a part of the annular shape is shown), for example, when viewed from the outer side in the axial direction, and a plurality of coil inner side cooling flow paths 10 are connected thereto in common.

The coil end portion cooling flow path 14 that is disposed at the coil end portion 9a may be disposed to extend in the circumferential direction on the outer side in the rotating shaft direction or the outer side in the circumferential direction. However, from the viewpoint of increasing the cooling efficiency, in order to increase the area of a waterway surface 14a facing the coil 9, it is preferable that the coil end portion cooling flow paths 14 are disposed on both the outer side in the rotating shaft direction and the outer side in the circumferential direction.

That is, the coil end portion cooling flow path 14 includes a coil end portion cooling flow path main body 14c provided in a region on the outer side in the rotating shaft direction, and an end portion side cooling flow path 14b provided in a region on the outer side in the circumferential direction. More specifically, the end portion side cooling flow path 14b is provided to extend from the coil end portion cooling flow path main body 14c in the space between the outer periphery-side side surface of the coil end portion 9a and the cylindrical portion 1a. A waterway length in the circumferential direction may be continuous for one round. However, it may be divided into a plurality of structures in the circumferential direction. The capacity (volume) of the coil end portion cooling flow path 14 is set in consideration of the capacity, the circulation speed, or the like of the circulating cooling water.

The coil end portion cooling flow path 14 (the coil end portion cooling flow path main body 14c and the end portion side cooling flow path 14b) can be obtained by a method of directly molding a resin material (the second resin composition) on the stator 6 and the end portion (that is, the coil end portion 9a) in the rotating shaft direction of the coil 9. In this case, the inner wall 14a of the coil end portion cooling flow path 14 is configured as a part of the hardened material injected into the coil end portion 9a.

In the following, an example of applying the method of directly molding a resin material on the stator 6 and the end portion (that is, the coil end portion 9a) in the rotating shaft direction of the coil 9 will be described.

After the coil inner side cooling flow path 10, the insulating layer 11, the coil 9, and the coil end portion cooling flow path 14 are disposed in the stator 6, the gap between the members is filled with a resin material and the members are fixed. It is assumed that this resin material can withstand the heat generated by the coil 9.

<Second Resin Composition>

It is desirable that the resin materials (the first and second resin compositions) which are filled in the coil inner side cooling flow path 10, the coil end portion cooling flow path 14, the coil 9, the stator 6, and the gap between the members are resin materials with good thermal conductivity, and it is possible to use one type of resin or a combination of a plurality of types of resins for each member. For example, one or two types of thermosetting resins selected from the group consisting of an epoxy resins and a phenol resins can be used.

The coil end portion cooling flow path 14 is molded by a mold configuring a waterway shape. Various moldings of the insulating layer 11, the coil inner side cooling flow path 10, and the coil end portion cooling flow path 14 may be performed at the same time. However, they can also be performed stepwise, and a resin material can be changed for each molding location. For example, the first resin composition is used as the resin material when molding the coil inner side cooling flow path 10, and the second resin composition different from the first resin composition is used as the resin material when molding the coil end portion cooling flow path 14.

The second resin composition has the same application range as that of the first resin composition described in the first embodiment, and is obtained by hardening the same resin composition or a different resin composition. Specifically, it is as follows.

Thermal conductivity K2 of a second hardened resin material, which is a hardened material of the second resin composition, is in a range of 1 to 10 W/m·K. The lower limit of the thermal conductivity K2 is preferably 2 W/m·K or more, and more preferably 3 W/m·K or more. The upper limit of the thermal conductivity K2 is not particularly limited. However, it is 10 W/m·K as a realistic value.

A glass transition temperature Tg2 of the second hardened resin material is 150° C. or higher.

The glass transition temperature Tg2 is set to be within the above range, so that it is possible to improve the heat resistance performance of the motor 100A and realize a high output.

When a sample obtained by heat-treating the second hardened resin material at 175° C. for 4 hours is measured using a dynamic viscoelasticity measuring device under the conditions of a measurement temperature in a range of −50° C. to 200° C., a temperature increase rate of 5° C./min, a load of 800 gf, a frequency of 10 Hz, and a three-point bending mode, the storage elastic modulus at 25° C. is 20 GPa or more and 70 GPa or less.

The lower limit of the storage elastic modulus is preferably 30 GPa or more, and more preferably 40 GPa or more.

The upper limit of the storage elastic modulus is preferably 60 GPa or less, and more preferably 50 GPa or less.

From this point of view as well, the storage elastic modulus is set to be within the above range, so that the heat resistance performance of the motor 100A can be improved and a high output can be realized.

A resin thickness t2 of the second hardened resin material that covers the coil side surface portion 9b of the coil 9 is 0.3 mm or more and 3.0 mm or less.

The lower limit of the resin thickness t2 is preferably 0.5 mm or more, and more preferably 0.7 mm or more. The upper limit of the resin thickness t2 is preferably 2.5 mm or less, and more preferably 2.0 mm or less.

The resin thickness t2 is set to be within the above range, so that it is possible to appropriately maintain the insulation properties and to favorably transmit heat generated in the coil 9 to the coil end portion cooling flow path 14.

A relational expression P2=t2/K2 between the resin thickness t2 and the thermal conductivity K2 of the second hardened resin material is $0.3 \times 10^{-4}$ (m²K/W) or more and $3 \times 10^{-3}$ (m²K/W) or less.

The lower limit of the relational expression P1 is preferably $0.4 \times 10^{-4}$ (m²K/W) or more, and more preferably $0.5 \times 10^{-4}$ (m²K/W) or more. The upper limit of the relational expression P1 is preferably $2.5 \times 10^{-3}$ (m²K/W) or less, and more preferably $2 \times 10^{-3}$ (m²K/W) or less.

The value of the relational expression P2 is set to be within the above range, so that it is possible to appropriately maintain the insulation properties and to favorably transmit the heat generated in the coil 9 from the coil end portion 9a to the coil inner side cooling flow path 14.

<Flow Path Connection Part 12>

In the present embodiment, the flow path connection part 12 is disposed to be sandwiched between an inner wall 1d of each of the side plate portions 1b and 1c, an end portion 10c of the coil inner side cooling flow path 10, and an end portion 14d of the coil end portion cooling flow path 14. A packing, an O-ring, a sealing material, or the like necessary for preventing leakage of the cooling liquid is disposed at each of the joined portions of the coil inner side cooling flow path 10, the flow path connection part 12, and the side plate portions 1b and 1c. The flow path connection part 12 may be configured to be configured as an independent part and mounted to the end portion of the coil inner side cooling flow path 10, as in the first embodiment, or may be integrated with each of the side plate portions 1b and 1c, and it is favorable if the coil inner side cooling flow path 10, the coil end portion cooling flow path 14, and the external connection flow path 17 can appropriately communicate with each other.

As described above, the coil inner side cooling flow path 10 formed in each slot 8 of the stator 6 and the coil end portion cooling flow path 14 formed at the coil end portion are connected to the flow path connection part 12 that is disposed inside each of the side plate portions 1b and 1c, and are further connected to the cooling liquid inlet and outlet of each of the side plate portions 1b and 1c, so that the motor 100 can be cooled.

The flow path connection part 12 can control the flow of the cooling water to the many coil inner side cooling flow paths 10 by adjusting the design of the flow path groove together with the split structure in the circumferential direction of the coil end portion cooling flow path 14. Similarly, by adjusting the design of the flow path groove of the flow path connection part 12, the inlet and outlet for the cooling water can be collectively disposed at one of the side plate portions 1b and 1c, or the inlet and outlet can be disposed in the cylindrical portion 1a.

<Operations and Effects of Coil Inner Side Cooling Flow Path 10 and Coil End Portion Cooling Flow Path 14>

According to the present embodiment, in the motor 100A having a distributed winding, the heat generated by the coils 9 can be efficiently dissipated to the coil inner side cooling flow path 10 adjacent thereto and the coil end portion cooling flow path 14, and the space around the coil 9 (that is, the slot 8 and the space at the end portion in the axial direction of the coil) can be replaced with a resin material, so that heat transfer can be further facilitated.

In the coil end portion 9a as well, heat conduction is improved by changing the spatial heat dissipation of the first embodiment to the contact type heat transfer to the coil end portion cooling flow path 14 through the resin material. In this way, the cooling performance of the stator 6 can be improved, a copper loss (a loss that is consumed by the resistance of the winding of the coil 9 itself) can be reduced, the motor output can be improved, and downsizing or the like of the motor 100 can be realized.

<Summary of Features and Functions of Motor 100A (Dynamo-electric Machine)>

The features of the motor 100A of the present embodiment will be collectively described with a focus on the cooling structure.

The motor 100A of the present embodiment has the same features and functions as the features and functions (1) to (15) of the motor 100 of the first embodiment, and the following features and functions (16) to (22).

(16) The cooling structure for the motor 100A may further include: the second hardened resin material (the insulating layer 13) obtained by hardening the second resin composition that covers the coil end portions 9a protruding from both ends in the axial direction of the stator 6; and the coil end portion cooling flow path 14 (the second cooling flow path) which is connected to the coil inner side cooling flow path (the first cooling flow path), is provided in a region of the second hardened resin material (the insulating layer 13) that covers the coil end portion 9a, and extends in the circumferential direction, and in which the coolant circulates outside the coil end portion 9a in the rotating shaft direction.

(17) The second resin composition has the same application range as that of the first resin composition, and is obtained by hardening the same resin composition or a different resin composition.

(18) The inner wall of the coil end portion cooling flow path 14 (the second cooling flow path) includes the second hardened resin material. That is, at least a part of the configuration of the coil end portion cooling flow path 14 may be made of the second hardened resin material.

(19) The resin thickness t2 of the second hardened resin material (the insulating layer 13) that covers the coil end portion 9a may be 0.3 mm or more and 3 mm or less.

(20) The relational expression P2=t2/K2 between the resin thickness t2 and thermal conductivity K2 of the second hardened resin material (the insulating layer 13) may be $0.3 \times 10^{-4}$ ($m^2$K/W) or more and $3 \times 10^{-3}$ ($m^2$K/W) or less.

(21) The cooling structure for the motor 100A further includes: the housing 1 having the housing tubular portion 1a provided in a tubular shape around the stator 6, and the housing side plate portions 1b and 1c that close openings at both ends of the housing tubular portion 1a; and the connection portion (the flow path connection part 12) provided between the second hardened resin material (the insulating layer 13) that covers the coil end portion 9a and each of the housing side plate portions 1b and 1c, in which the coil end portion cooling flow path 14 includes the second hardened resin material (the insulating layer 13) and the connection portion 12.

(22) The connection portions (the flow path connection parts 12) are provided to integrally protrude from the housing side plate portions 1b and 1c toward the coil end portions 9a.

The embodiments of the present invention have been described above. However, these embodiments are exemplification of the present invention, and various configurations other than those described above can also be adopted. For example, the winding method of the coil 9 is not limited to the distributed winding, and the same cooling function can also be exhibited by a concentrated winding or other winding methods. Further, although the coil inner side cooling flow path 10 is disposed on the rotor outer peripheral surface 2a side of the slot 8 with respect to the coil 9, it may be disposed on the case 1 (the cylindrical portion 1a) side, or the coil inner side cooling flow paths 10 may be disposed on both sides.

This application claims priority based on Japanese Patent Application No. 2020-098293 filed on Jun. 5, 2020 and Japanese Patent Application No. 2021-000721 filed on Jan. 6, 2021, the entirety of the disclosures of which is incorporated herein.

REFERENCE SIGNS LIST 1 case
1a cylindrical portion
1b, 1c side plate portion
2 rotor
2a rotor outer peripheral surface
3 rotating shaft
4 bearing
5 permanent magnet
6 stator
7 tooth portion
8 slot
9 coil
9a coil end portion
9b coil side surface portion
10 coil inner side cooling flow path
10a inner wall
11, 13 insulating layer
14 coil end portion cooling flow path
14a inner wall
14b end portion side cooling flow path
14c coil end portion cooling flow path main body
100, 100A motor

The invention claimed is:

1. A cooling structure for a dynamo-electric machine which includes a stator having a plurality of tooth portions, a coil wound around the tooth portions, and a slot in which the coil is formed between the tooth portions, and in which the coil is provided in the slot, the cooling structure comprising:
a first resin composition with which the slot is filled and which covers the coil;
a first cooling flow path which is provided in a region filled with the first resin composition and extends in a rotating shaft direction, and in which a coolant circulates inside;
a second hardened resin material obtained by hardening a second resin composition that covers the coil end portions protruding from both ends in the axial direction of the stator;
a second cooling flow path, which is connected to the first cooling flow path, is provided in a region of the second hardened resin material that covers the coil end portions, and extends in a circumferential direction;
a housing having a housing tubular portion provided in a tubular shape around the stator and housing side plate portions that close openings at both ends of the housing tubular position; and
a connection portion provided between the second hardened resin material that covers the coil end portions and each of the housing side plate portions;
wherein an inner wall of the first cooling flow path is made of a first hardened resin material which is a member obtained by hardening the first resin composition;
wherein a thermal conductivity K1 of the first hardened resin material is in a range of 1 to 10 W/m·K;
wherein a glass transition temperature Tg1 of the first hardened resin material is 150° C. or higher;
wherein the first cooling flow path is provided on a rotating shaft direction side with respect to the coil; and
wherein the second cooling flow path includes a coil end portion cooling flow path main body provided in the region on an outer side in the rotating shaft direction, and an end portion side cooling flow path provided to extend from the coil end portion cooling flow path main body and provided in the region on the outer side in the circumferential direction;
wherein the second cooling flow path includes the second hardened resin material and the connection portion; and
wherein the connection portion is provided as a separate body from each of the housing side plate portions.

2. The cooling structure for a dynamo-electric machine according to claim 1, wherein when a sample obtained by heat-treating the first hardened resin material at 175° C. for 4 hours is measured using a dynamic viscoelasticity measuring device under conditions of a measurement temperature in a range of −50° C. to 200° C., a temperature increase rate of 5° C./min, a load of 800 gf, a frequency of 10 Hz, and a three-point bending mode, a storage elastic modulus of the sample at 25° C. is 20 GPa or more and 70 GPa or less.

3. The cooling structure for a dynamo-electric machine according to claim 1, wherein a resin thickness t1 of the first resin composition that covers a side surface portion of the coil is 0.3 mm or more and 3.0 mm or less.

4. The cooling structure for a dynamo-electric machine according to claim 3, wherein a relational expression $P1=t1/K1$ between the resin thickness t1 and thermal conductivity K1 of the first resin composition is $0.3\times10^{-4}$ (m²K/W) or more and $3\times10^{-3}$ (m²K/W) or less.

5. The cooling structure for a dynamo-electric machine according to claim 1, wherein the coil is configured as a distributed winding wound across a plurality of the slots.

6. The cooling structure for a dynamo-electric machine according to claim 5, wherein at least one of the first cooling flow paths is provided for each set of slots configuring one distributed winding.

7. The cooling structure for a dynamo-electric machine according to claim 1, wherein the first resin composition includes one or two types of thermosetting resins selected from the group consisting of an epoxy resin and a phenol resin.

8. The cooling structure for a dynamo-electric machine according to claim 1, wherein the second resin composition has the same application range as that of the first resin composition, and is obtained by hardening the same resin composition or a different resin composition.

9. The cooling structure for a dynamo-electric machine according to claim 1, wherein an inner wall of the second cooling flow path includes the second hardened resin material.

10. The cooling structure for a dynamo-electric machine according to claim 1, wherein a resin thickness t2 of the second hardened resin material that covers the coil end portions is 0.3 mm or more and 3 mm or less.

11. The cooling structure for a dynamo-electric machine according to claim 10, wherein a relational expression $P2=t2/K2$ between the resin thickness t2 and thermal conductivity K2 of the second hardened resin material is $0.3\times10^{-4}$ (m²K/W) or more and $3\times10^{-3}$ (m²K/W) or less.

12. The cooling structure for a dynamo-electric machine according to claim 1, wherein the connection portion is provided to integrally protrude from each of the housing side plate portions toward each of the coil end portions.

13. A dynamo-electric machine having the cooling structure according to claim 1.

14. A cooling structure for a dynamo-electric machine which includes a stator having a plurality of tooth portions, a coil wound around the tooth portions, and a slot in which the coil is formed between the tooth portions, and in which the coil is provided in the slot, the cooling structure comprising:

a first resin composition with which the slot is filled and which covers the coil;

a first cooling flow path which is provided in a region filled with the first resin composition and extends in a rotating shaft direction, and in which a coolant circulates inside;

a second hardened resin material obtained by hardening a second resin composition that covers the coil end portions protruding from both ends in the axial direction of the stator;

a second cooling flow path, which is connected to the first cooling flow path, is provided in a region of the second hardened resin material that covers the coil end portions, and extends in a circumferential direction;

a housing having a housing tubular portion provided in a tubular shape around the stator and housing side plate portions that close openings at both ends of the housing tubular position; and a connection portion provided between the second hardened resin material that covers the coil end portions and each of the housing side plate portions;

wherein an inner wall of the first cooling flow path is made of a first hardened resin material which is a member obtained by hardening the first resin composition;

wherein a thermal conductivity K1 of the first hardened resin material is in a range of 1 to 10 W/m·K;

wherein when a sample obtained by heat-treating the first hardened resin material at 175° C. for 4 hours is measured using a dynamic viscoelasticity measuring device under conditions of a measurement temperature in a range of −50° C. to 200° C., a temperature increase rate of 5° C./min, a load of 800 gf, a frequency of 10 Hz, and a three-point bending mode, a storage elastic modulus of the sample at 25° C. is 20 GPa or more and 70 GPa or less;

wherein the first cooling flow path is provided on a rotating shaft direction side with respect to the coil;

wherein the second cooling flow path includes a coil end portion cooling flow path main body provided in the region on an outer side in the rotating shaft direction, and an end portion side cooling flow path provided to extend from the coil end portion cooling flow path main body and provided in the region on the outer side in the circumferential direction;

wherein the second cooling flow path includes the second hardened resin material and the connection portion; and wherein the connection portion is provided as a separate body from each of the housing side plate portions.

* * * * *